United States Patent [19]

Hunnicutt et al.

[11] 3,956,845

[45] May 18, 1976

[54] AUTOMATIC FISHING POLE

[76] Inventors: Max E. Hunnicutt, 9533 Lutheran Way, Santee, Calif. 92071; William H. Michael, 1306 N. Magnolia, Sp. 37, El Cajon, Calif. 92020

[22] Filed: Apr. 1, 1975

[21] Appl. No.: 564,045

[52] U.S. Cl............................................ 43/6.5; 43/15
[51] Int. Cl.².............................................. A01K 79/00
[58] Field of Search................................ 43/6.5, 15

[56] References Cited
UNITED STATES PATENTS

| | | | |
|---|---|---|---|
| 3,710,499 | 1/1973 | Tadano | 43/6.5 |
| 3,813,806 | 6/1974 | Nishida et al. | 43/15 |
| 3,863,379 | 2/1975 | Kobayashi | 43/6.5 |

*Primary Examiner*—Louis G. Mancene
*Assistant Examiner*—Daniel J. Leach

[57] ABSTRACT

An automatic fishing pole consisting of a boom attached via a double swivel to a boat rail which rotatably carries a hollow fishing rod member on an outboard end thereof. A fish line with a suitable lure drops from the end of the rod member into the water and extends through the hollow rod member to a spring-loaded hydraulic linkage whereby upon hooking a fish the resultant line tension will rotate the hydraulic linkage, applying hydraulic pressure to a rotary actuator which is coupled to the rod member rotating the rod toward the boat and pulling the fish out of the water. At a pre-determined angle orientation of the rod, a spring-loaded pause valve is partially closed slowing the rotation of the rod and swinging the fish inboard toward the deck of the boat, whereby upon the completion of its rotative arc, the fish is deposited on the deck and returns to its original position.

6 Claims, 5 Drawing Figures

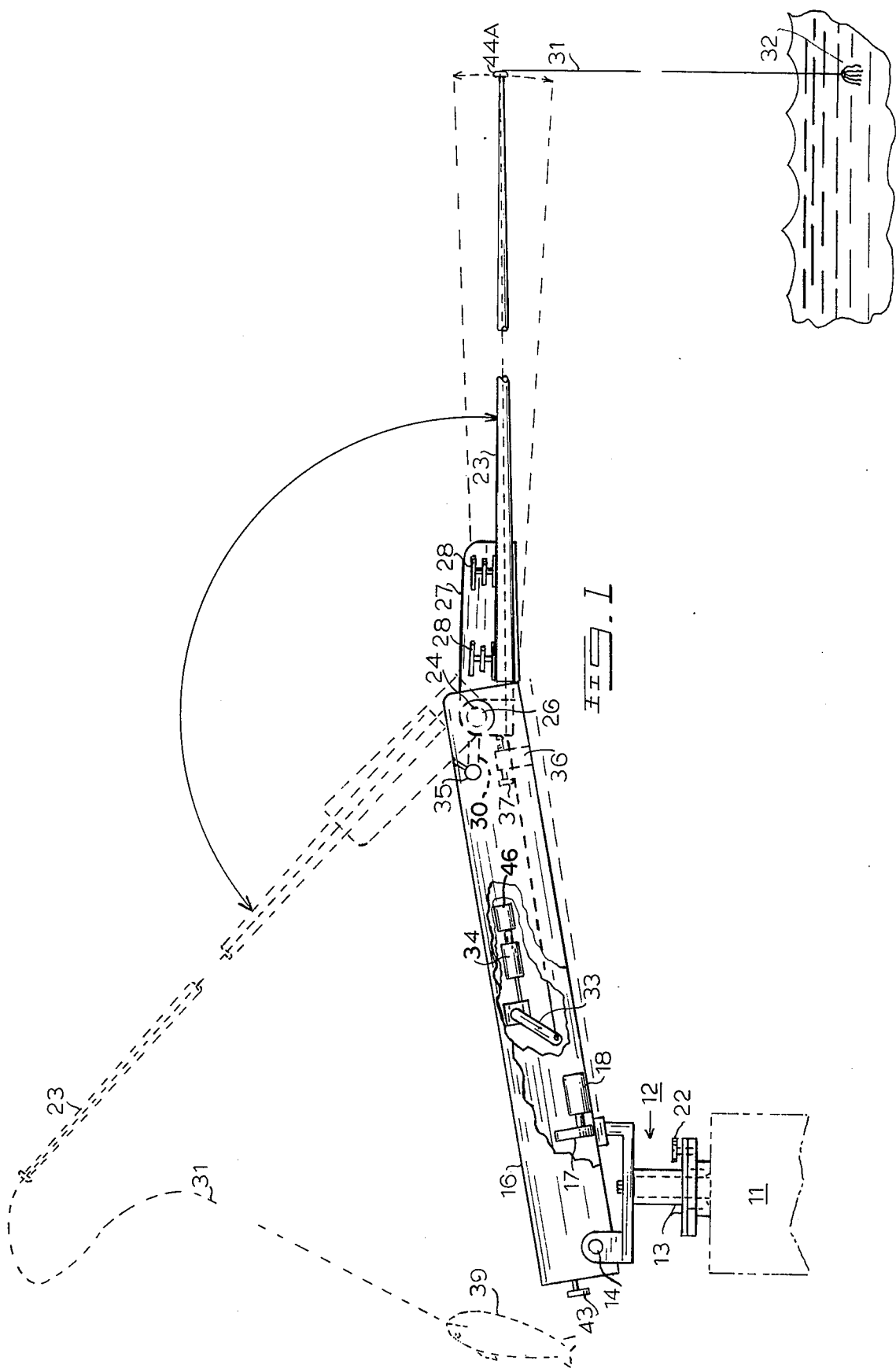

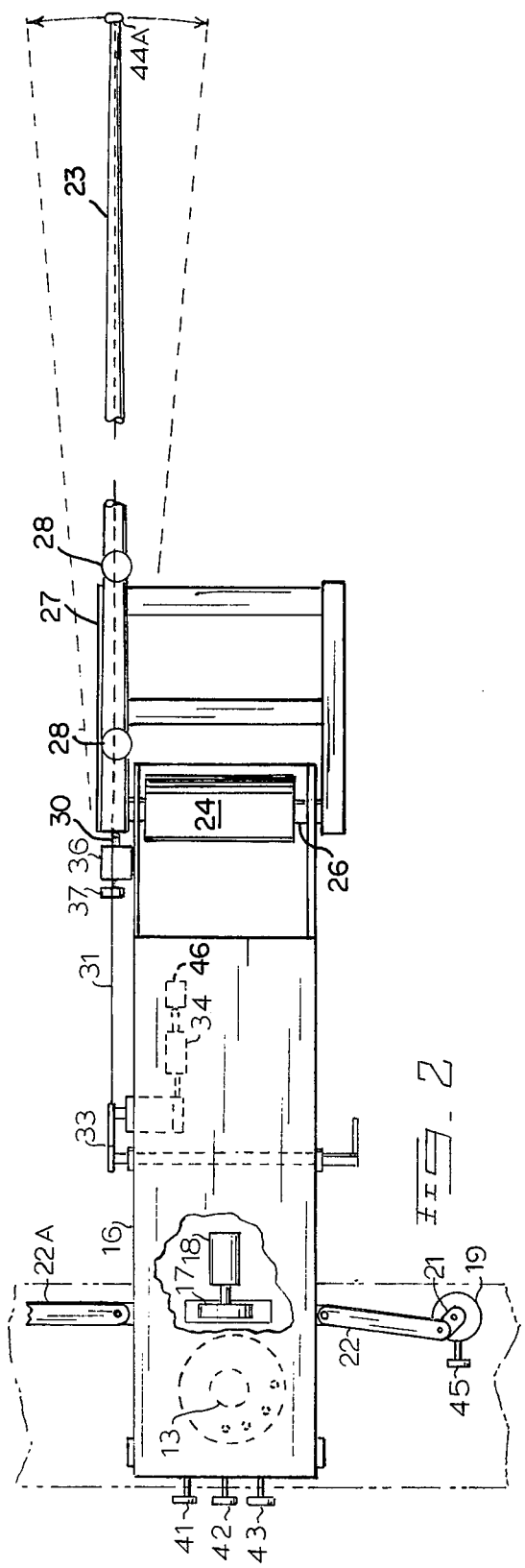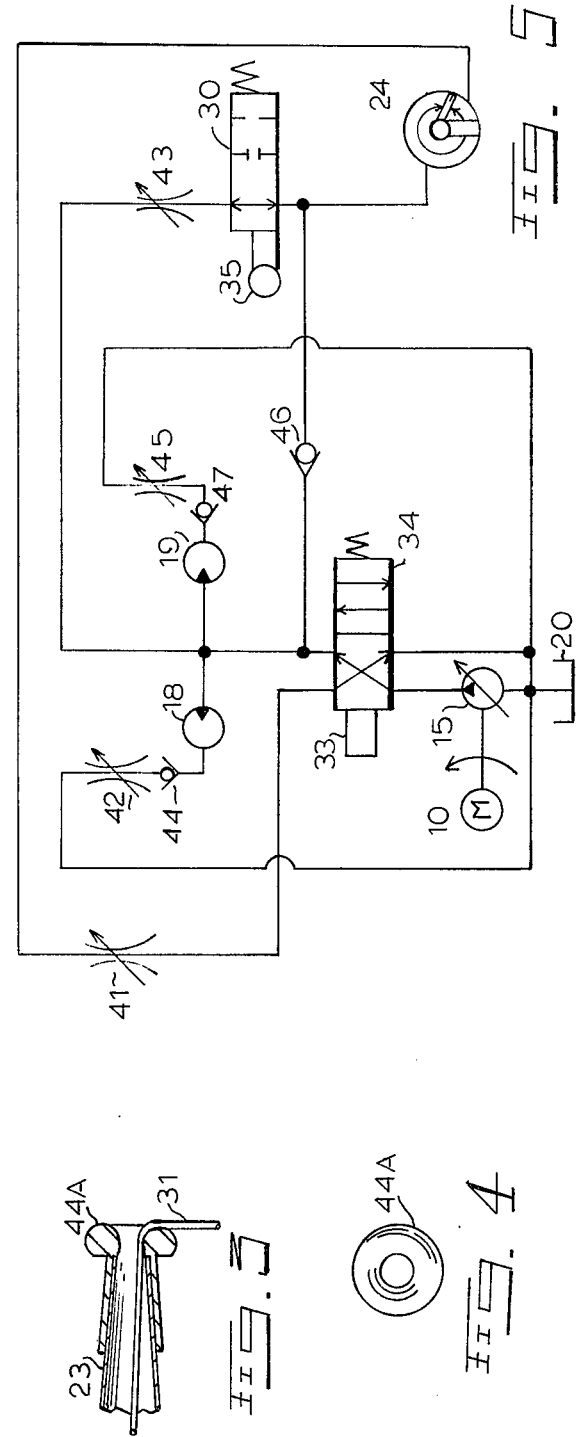

AUTOMATIC FISHING POLE

BRIEF DESCRIPTION OF THE INVENTION

The present invention relates to an automatic fishing pole and more particularly to an automatic fishing pole having a pivotal return axis extending outwardly from a fishing boat for proper deposition of the fish on the boat deck.

According to the invention, an automatic fishing pole is provided having a boom member swively coupled to a fishing boat railing and a fishing rod rotatably mounted to said boom member outwardly of said fishing boat railing which automatically rotates in an upward inboard direction in response to hooking a fish on a line extending therefrom into the water. Quiescently, i.e., prior to the hooking of a fish, a hydraulic motor exerts pressure against a rotary actuator coupled to the rod holding the rod in a downward extended position over the water. In response to pressure on the line exerted by a hooked fish, a hydraulic linkage is actuated reversing hydraulic fluid to rotary actuator through a spring-loaded valve which rotates the fishing pole in an upward direction toward an inboard and outboard/inboard direction. After a pre-determined angle of rotation, a cam partially closes a spring-loaded two-way valve which causes the rotary action to pause which in most instances allows the momentum of the fish to swing the fish onto the deck of the fishing boat. If the fish is disengaged at this point, the linkage is spring-returned and the pole drops back to its original position. If the fish is not disengaged, the pole continues to swing in its arcuate course toward the deck, dropping the fish on the deck, which rotates the pole back to its original position. If, again, the fish is still engaged, the linkage will reverse the hydraulic fluid to the rotary actuator, causing the pole to rotate back toward the deck of the boat. This oscillation will continue until the fish has disengaged itself from the hook and the pole is rotated back to an outboard extended position ready for the next fish.

A further feature is the utilization of a hunt motor which is coupled to the boom member, causing a horizontal oscillation, together with the squid motor which is coupled to a vertical swivel causing a vertical oscillation. These movements imitate the movement of an acutal fisherman with a hand-held fishing pole and are instrumental in further attracting fish to the lure.

An object of the present invention is the provision of an improved automatic fishing pole.

Another object is the provision of an automatic fishing pole having a pivot point disposed outwardly of a ship's railing.

A further object of the invention is the provision of an automatic fishing pole having hunt and squid movements.

Yet another object of the invention is the provision of a fishing pole which automatically disengages the fish from the hook.

Other objects and many of the attendant advantages of the present invention will be readily understood when considered in connection with the accompanying drawings in which like reference numerals designate like parts throughout the Figures thereof and wherein:

FIG. 1 is a side elevational view partially broken away of the preferred embodiment of the present invention in situ;

FIG. 2 is a top view of the embodiment of FIG. 1;

FIG. 3 is an enlarged view of a portion of FIG. 1;

FIG. 4 is a front elevational view of the pole tip of FIG. 3; and

FIG. 5 is a schematic representation of the hydraulic system of the embodiment of FIG. 1.

DETAILED DESCRIPTION OF THE DRAWING

Referring to FIGS. 1 and 2, a fishing boat railing is shown generally at 11 with a double-swivel assembly 12 fixedly attached thereto having a horizontal swivel 13 and a vertical swivel 14. A boom assembly 16 is coupled to double-swivel assembly 12 at vertical swivel 14 in proximity with eccentric cam 17 which is rotatably attached to hydraulic squid motor 18. Hydraulic hunt motor 19 is coupled via linkage 21 to linkage 22 which in turn is rotatably coupled to horizontal swivel 13. Hollow fishing rod 23 is carried by rotary actuator 24 which is rotatably coupled at 26 to boom assembly 16. Mounting assembly 27 carries pole 23 via thumb screws 28. Hollow pole assembly 23 has a fishing line 31 threaded therethrough which carries a lure 32 at one end and is coupled to linkage 33 at another end. Linkage 33 actuates spring-loaded four-way valve 34. Stop 36 carries adjustable screw 37 which rests against the end of mounting assembly 27 in the extended position of rod 23. Rod 23 is shown in phantom in its inboard position with a fish 39 attached to line 31. Control valve 45 extends from hunt motor 19. Cross linkages 22A are coupled between hunt motors 19 so that adjacent booms will be in an azimuth sweeping synchronization.

Referring to FIG. 3, the end of rod 23 is shown having a fair lead pole tip 44A with line 31 bearing thereon.

Referring to FIG. 4, a front elevational view of ferrule lead pole tip 44A is shown.

Referring to FIG. 5, hydraulic motor 10 is coupled to hydraulic pump 15 which has one end coupled to hydraulic reservoir 20 and another end coupled to one input of four-way spring-loaded valve 34. Four-way spring-loaded valve 34 is coupled to one side of check valve 46 and to one side of squid motor 18 and hunt motor 19 and through control valve 43 to one side of two-way spring-loaded valve 30. Another side of squid motor 18 is coupled through check valve 44 and control valve 42 to oil reservoir 20. Another side of hunt motor 19 is coupled through check valve 47 and control valve 45 to reservoir 20. Four-way spring-loaded valve 34 has a return line to oil reservoir 20 and another line through control valve 41 to rotary actuator 24. Another side of rotary actuator 24 is coupled to two-way spring-loaded valve 30 and to another side of check valve 46. Two-way spring-loaded valve 30 is reversed via cam 35. Four-way spring-loaded valve 34 is reversed by linkage 33.

OPERATION

Referring back to all of the Figures, and particularly FIG. 5, the operation will be described. The position of valves 34, and 30 shown are the positions with rod 23 in the horizontal position shown in FIG. 1. In these positions, hydraulic pressure from pump 15 is applied through check valve 46 to rotary actuator 24, the other side of which is returned through control valves 41 to oral reservoir 20. This applies hydraulic pressure to hold rod 23 against stop 37 as shown in FIG. 1. Hydraulic fluid actuates squid motor 18 through check valve 44 and control valve 42 back to reservoir 20. Hunt motor 19 is also actuated through check valve 47 and control valve 45 back to reservoir 20. Check valve 46 short circuits valve 30 in this position. Hence, hunt motor 19 oscillates the entire assembly around swivel mounting 13 and squid motor 18 oscillates the entire assembly vertically via eccentric cam 17. Should there be a plurality of the assemblies in parallel along a ship rail, they can be linked via synchronizing links 22A so that lines do not get crossed during azimuth oscillations.

When a fish takes lure 32 and applies tension to line 31, linkage 33 is rotated which switches four-way valve 34 to the opposite condition. In this position, pressure to rotary actuator 24 is reversed through control valve 41 on one side and through two-way valve 30 on the other side. Hunt motor 19 and squid motor 18 are immobilized because each end is returned to reservoir 20. Any residual pressure is removed via check valves 47 and 44. When rod 23 rotates to a predetermined position, cam 35 is contacted and switch 30 is reversed, i.e., closed. Here it is pointed out that in the closed position, switch 30 is designed to leak a small amount of fluid which effects a pause in the rotation at the time since the majority of hydraulic pressure is removed from rotary actuator 24. At this time, the momentum of fish 39 carries it over past the railing 11 and over a deck portion of the fishing boat, and because of the use of a barbless hook, is disengaged. In the event fish 39 is not disengaged, rotation will continue as soon as cam 35 loses physical contact and with mounting member 27 and fish 39 eventually rests on the deck of the fishing boat. At this time, linkage 33 is relaxed and valve 34 reversed to the position shown in FIG. 5, applying opposite pressure to rotary actuator 24. Hence, the rod 33 and mounting means 27 will rotate back toward the water until fish 39 again actuates linkage 33. This oscillation will continue until fish 39 is eventually shaken loose from the lure, at which time rod 23 and mounting means 27 will be returned to the position shown in FIG. 1. A stainless steel fair lead pole tip is utilized as an anti-fouling means for line 31 as can be seen with reference to FIGS. 3 and 4.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:

1. An automatic fishing pole comprising:
    a boom assembly carried at one end thereof by a boat rail and extending outboard therefrom;
    a hollow fishing rod assembly rotatably carried by the outboard end of said boom assembly;
    a fishing line passed through the center of said hollow fishing rod and terminating at one end in a lure disposed beneath a water level at one extreme rotative position of said fishing rod;
    a hydraulic rotary actuator carried by said boom assembly and coupled to said rod assembly operable for applying rotative force to said rod assembly;
    a hydraulic linkage coupled to another end of said fishing line and to a spring-loaded hydraulic valve; and
    a hydraulic pump, said spring-loaded hydraulic valve coupled in series between said hydraulic pump and said rotary actuator, said hydraulic linkage being operable for applying hydraulic pressure to said rotary actuator upon a tensioning of said fishing line whereby said fishing pole assembly is rotated in a vertical plane when a fish is hooked, placing said fish on the deck of said boat.

2. The automatic fishing pole of claim 1 and further includng:
    a second spring-loaded hydraulic valve coupled in series between said first mentioned hydraulic valve and said rotary actuator, said second spring-loaded hydraulic valve being cam-actuated and carried by said boom assembly, and being positioned for actuation by said hollow fishing rod assembly after a predetermined angle of rotation whereby hydraulic pressure to said rotary actuator is reduced.

3. The automatic fishing pole of claim 1 wherein:
    said boom assembly is swively attached to said boat rail and is coupled to a hydraulic motor operable for producing horizontal oscillations.

4. The automatic fishing pole of claim 1 wherein:
    said boom assembly is swively attached to said boat rail and is coupled to a hydraulic motor operable for producing vertical oscillations of said boom assembly.

5. The automatic fishing pole of claim 1 wherein:
    said boom assembly rotates inboard to clear side of boat for docking.

6. The automatic fishing pole of claim 1 wherein:
    the ferrule tip of said fishing pole is designed to allow smoothness and freedom of four way valve action by less friction of the line.

* * * * *